United States Patent [19]

Harter

[11] 4,070,161
[45] Jan. 24, 1978

[54] DOUBLE SEAL GATE VALVE STRUCTURE

[75] Inventor: Donald J. Harter, Holmdel, N.J.

[73] Assignee: General Electric Company, Schenectady, N.Y.

[21] Appl. No.: 696,874

[22] Filed: June 17, 1976

[51] Int. Cl.² .......................... F16K 3/02; F16K 3/18; C10J 3/06
[52] U.S. Cl. .................................... 48/210; 251/326; 251/328; 251/193; 137/246; 137/559
[58] Field of Search ............... 251/326, 327, 328, 144, 251/193; 137/613, 238, 241, 246, 329.02, 572, 575, 559; 48/210

[56] References Cited

U.S. PATENT DOCUMENTS

| | | | |
|---|---|---|---|
| 1,283,929 | 11/1918 | Simmons | 251/327 X |
| 2,499,382 | 3/1950 | Hamer | 137/613 X |
| 2,786,644 | 3/1957 | Koppl | 251/193 X |
| 2,986,367 | 5/1961 | Le Rouax | 251/328 X |
| 3,063,080 | 11/1962 | Bergman et al. | 251/326 X |
| 3,144,238 | 8/1964 | Williams | 251/327 X |
| 3,232,494 | 2/1966 | Poarch | 137/575 X |
| 3,478,771 | 11/1969 | Johnson | 251/327 X |
| 3,782,411 | 1/1974 | Turner | 137/559 X |
| 3,867,110 | 2/1975 | Schora et al. | 48/210 |
| 3,933,618 | 1/1976 | Patton | 48/210 |
| 3,976,443 | 8/1976 | Paull | 48/210 X |
| 3,999,522 | 12/1976 | Jaulmes | 251/193 X |

Primary Examiner—William R. Cline
Attorney, Agent, or Firm—Richard G. Jackson; Joseph T. Cohen; Jerome C. Squillaro

[57] ABSTRACT

A gate valve structure is shown embodying an elongate slide member movable within an elongate housing. The slide member carries a pair of annular seals spaced apart along the length of a valve body and has a bore therein extending through the valve body at a location between the seals. By linear movement of the slide member the bore and seals are each selectively registerable with aligned openings through the housing. This valve structure has operating and maintenance characteristics, which are particularly advantageous for use in the charging and/or discharging of fixed bed coal gasifiers.

27 Claims, 3 Drawing Figures

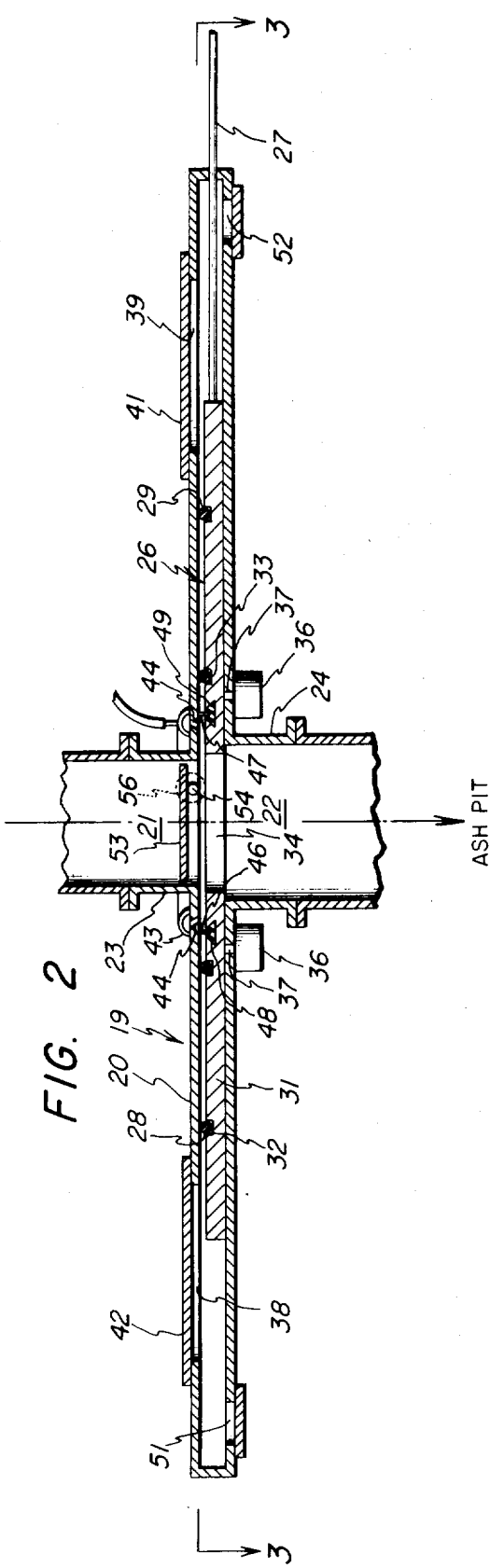
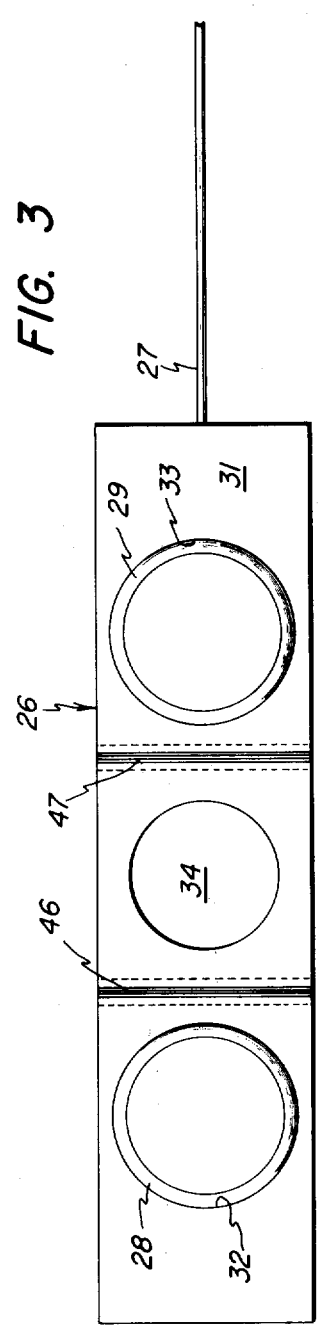

DOUBLE SEAL GATE VALVE STRUCTURE

BACKGROUND OF THE INVENTION

In the fixed bed coal gasification process, coal enters the gasifier at the top and lands on the previous charge. Steam and an oxidizing gas are admitted to the underside of the gasifier vessel. As the combustion being carried near the bottom of the gasifier consumes some of the coal and the rest of the coal is gasified, coal deposited at the top of the charge gradually moves down through the gasifier vessel passing through a series of treatment stages: initial heating; devolatilization and coking; gasification; and carbon oxidation. A large number of chemical reactions occur during these stages with a minimum temperature of about 1700°–1900° F being required. When air and steam are introduced to the combustion zone, the end product is producer gas; when oxygen and steam are employed, the end product is synthesis gas.

In the typical fixed bed coal gasifier the coal is introduced into the gasifier by means of a charging lock (lockhopper) arrangement and the ash is removed from the gasifier by means of a discharge lock. Each lock is provided with closure arrangements. These charging and discharge lock arrangements are troublesome in that the valves utilized to provide the necessary closure tend to leak as deposits of wet coal fines or ash accumulate on their surfaces. Removing and cleaning such valves incurs high maintenance costs and currently requires shutdown of the gasifier. Moreover, most valves in current use such as cone valves or ball valves are long in the flow direction which adds height and cost to the gasifier assembly.

SUMMARY OF THE INVENTION

The aforementioned problem of deposit buildup is minimized by the valve construction of the instant invention. The construction employed separates the charge function and the sealing function and, further, provides the capability for maintenance of the entire valve during operation of the gasifier thereby reducing the need for shutdown.

Thus, this invention is directed to a gate valve structure in which an elongate slide member is disposed within an elongate housing having first and second aligned openings through opposite walls of the housing to provide for the entry into and exit from the gate valve of the flow of divided solid material. The slide member comprises a longitudinally-extending valve body on which is mounted a pair of annular seals spaced apart along the length of the valve body with a hole, or bore, extending through the valve body at a location between the annular seals. Means are provided for causing the slide member to move longitudinally within the housing and, thereby, bring either of the seals into register with the openings in the housing to be sealed or bring the bore into register with the aligned openings.

When the bore is so in register, flow communication from the first to the second aligned opening is established and divided solid material can flow through the housing via these openings. When one or the other of the seals is in register with the opening to be sealed, this flow communication is cut off and sealing is accomplished by moving the valve body laterally (perpendicular to the previous movement) to force the seal against the area around the opening. Preferably, sealing will be accomplished against pressure, i.e., in the case of a pressurized gasifier, the valve opening on the gasifier side of the valve would be sealed so that the interior housing will be at atmospheric pressure. When one of the seals is occupied with carrying out the sealing function, the other seal is disposed at a location at which access thereto can be accomplished for removing or otherwise servicing such other seal.

When the valve of this invention is utilized in a coal gasifier, a flap valve is preferably provided to hold back the flow of divided solid material (e.g. coal or ash) so that it does not interfere with the movement of the slide member. Such a flap valve is provided with means for the movement thereof to a closed position in which it substantially shuts off solids flow before a gas seal is effected and to an open position in which substantially full flow is permitted.

BRIEF DESCRIPTION OF THE DRAWING

The features of this invention believed to be novel and unobvious over the prior art are set forth with particularity in the appended claims. The invention itself as to the organization, method of operation, and objects and advantages thereof, may best be understood by reference to the following description taken in conjunction with the accompanying drawing wherein:

FIG. 2 is a sectional view of the gate valve structure of the instant invention setting forth an arrangement such as may be advantageously employed at the discharge end of the sealable ash discharge vessel of FIG. 1 and FIG. 3 is a plan view of the slide member as viewed on line 3—3 of FIG. 2.

MANNER AND PROCESS OF MAKING AND USING THE INVENTION

Figure 1:
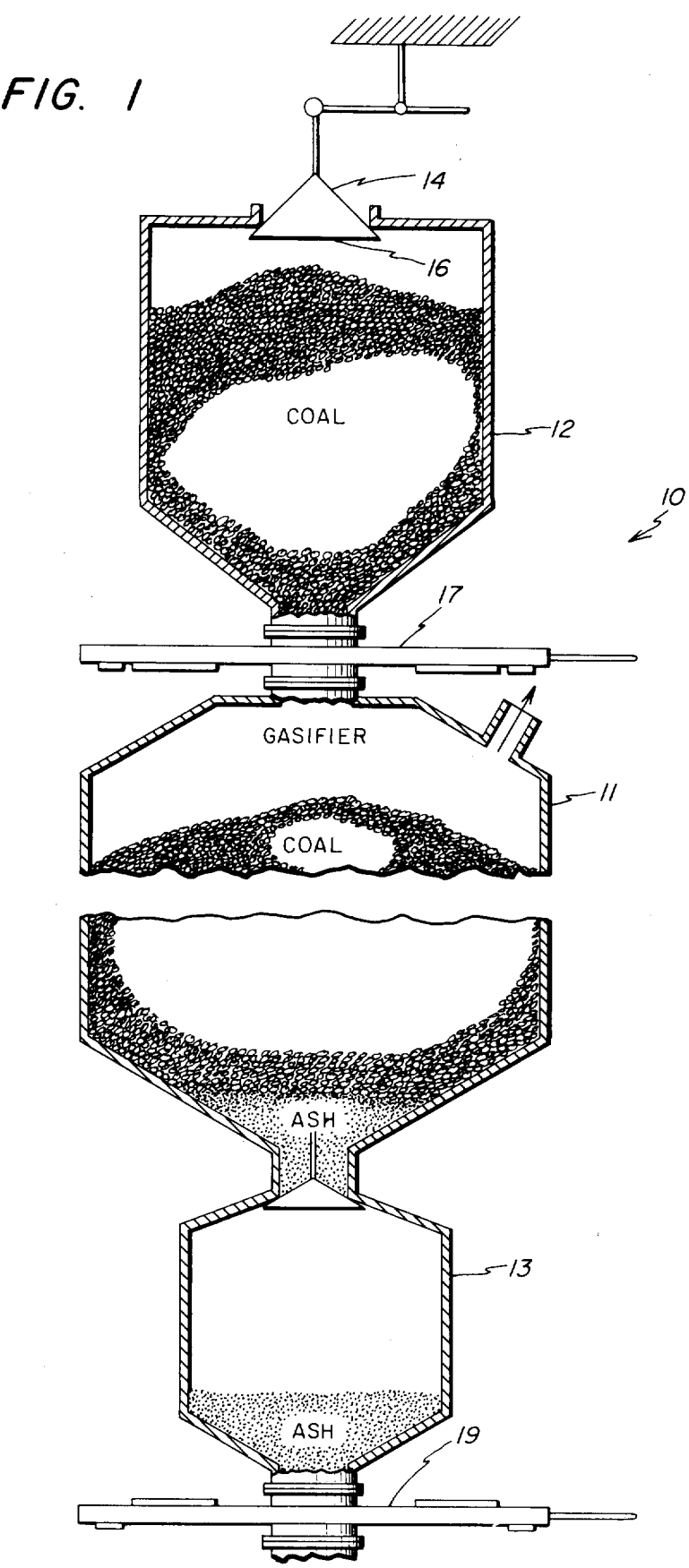
FIG. 1 is a schematic representation of a fixed bed coal gasifier apparatus comprising a gasifier vessel, a sealable solid fuel supply vessel and a sealable ash discharge vessel showing two applications of the valve construction of this invention to such an apparatus.

The gasifier apparatus 10 shown in FIG. 1 encompasses gasifier vessel 11, lockhopper 12 for supplying coal to gasifier 11 and lockhopper 13 for receiving ash from gasifier vessel 11 for ultimate discharge to the ash pit (not shown).

Coal is introduced through filling tube 14 into lockhopper 12, when valve 16 is lowered from said sealing engagement with the bottom edge of filling tube 14. In place of a similar closure member, as is conventional, the gate valve structure 17 of this invention (to be described hereinbelow) is employed. Gate valve 17 is in the closed, sealed position during this portion of the filling cycle. The coal passes between valve 16 and tube 14 until the lockhopper 12 is properly filled and then valve 16 is moved up to the closed position. When flow communication is established between vessels 11 and 12 by the proper adjustment of valve 17, the pressurized gas from gasifier vessel 11 enters lockhopper 12 and forces valve 16 into sealing engagement with a seating member (not shown) and coal passes from lockhopper 12 to gasifier 11 via valve 17.

A similar sequence is employed in discharging ash from the lower end of gasifier vessel 11 (via valve 18) into ash lockhopper 13 for subsequent discharge via valve 19. Valves 16 and 19 are of the cone type employed in the prior art. Valve constructions according to this invention can, of course, be employed at all the valve positions shown.

The arrangement for the gate valve structure most advantageously employed as valve 19 is set forth by way of illustration in FIG. 2. Elongate housing 20 is preferably in the general configuration of a hollow, rectangular prism having aligned openings 21 and 22 in the opposite walls thereof. Mounting flanges 23 and 24 further define openings 21, 22 respectively. Slide member 26 disposed within housing 20 is, preferably, also of substantially rectangular prismatic shape being linearly actuable in housing 20 by means of rod 27.

Since it is preferable during the conduct of the sealing function by valve 19 that the interior of housing 20 be at atmospheric pressure, annular seals 28, 29 are disposed on the upper surface of valve body 31 in annular recesses 32, 33, respectively whereby sealing on the high pressure side of valve 19 (opening 21) can be effectuated. Hole, or bore, 34 extends through valve body 31 and is shown in FIG. 1 in register with aligned housing openings 21 and 22.

When it is desired to arrange valve 19 to effectuate the sealing function, the slide member 26 may be moved either to the right or to the left by means of rod 27 to place either seal 28 or 29 into register with opening 21. Thereafter, by actuating a plurality (at least 3) of hydraulic cylinders 36 to simultaneously force pistons 37 against the underside of valve body 31, deformable resilient annular seal 28 or 29 will be forced into sealing engagement with the area around opening 21. Having effectuated such sealing action, the elevated pressure conditions prevailing in gasifier 11 are maintained therein while the interior of housing 20 is at atmospheric pressure.

Whenever one of the annular seals is disposed in register with opening 21, the other seal will be in register with one or the other of the access holes 38, 39. Thus, with annular seal 28 in register with opening 21, annular seal 29 can be reached by removing coverplate 41 over access hole 39 and, when annular seal 29 is in register with opening 21, annular seal 28 can be reached (e.g. for removal or service) via hole 38 by removing coverplate 42.

In valve 17, the disposition of the annular seals would be at the underside of valve body 31 and the access holes and coverplates would be on the underside of the housing 20, in order that pressurized conditions would be maintained in gasifier vessel 11, but the interior of valve housing 20 would be at atmospheric pressure.

If desired, annular compressed air squeegee 43 may be provided to clean away debris and/or to introduce a fluid flush for combined cleaning and lubrication of slide member 26. Such debris as may be loosened by the compressed air jets via holes 44 should fall through hole 34, when in register, and leave valve 19 through opening 22. The sealing surface around hole 21 will preferably be cleaned by scrapers 46, 47 (e.g. metal blades resiliently mounted in rubber in cavities 48, 49 respectively). Provision of the rubber in cavities 48, 49 provides for compliance by the scraper blades 46, 47 and also prevents the entry of material into the cavities.

A certain amount of debris will find its way to the extremities of housing 20 and cleanout holes 51, 52 are provided to accommodate removal of such debris.

Preferably, flap valve 53 is disposed in opening 21 to shut off this opening from the passage of divided solid material therethrough into contact with valve body 31 until slide member 26 has been moved to bring bore 34 into registry with opening 21. When this has been accomplished (or substantially so) flap valve 53 is pivoted around axis 54 as by actuation of gear 56 to move flap valve 53 to a vertical position in which it extends into bore 34 to permit the flow of divided solid material through valve 19. After the dumping operation has been completed, flap valve 53 is returned to the closed position, slide member 26 is moved to position the appropriate annular seal and slide member 26 is moved laterally by means of pistons 37 to bias the annular seal into sealing position.

This split responsibility between flap valve 53 and bore 34 on the one hand and seals 28, 29 on the other is a preferred combination, because it contributes to a more maintenance-free valve system. Conventional resilient sealing materials can be used for the manufacture of annular seals 28, 29. No special machining is necessary in the fabrication of the valve components and the height dimension of the valve is relatively small. The considerable extent of the valve construction in one dimension is not a problem, because the lockhopper hole on a full-scale gasifier apparatus is small compared to the overall dimension of the gasifier. Further, the sealing pressure that may be utilized for biasing seals 28, 29 is not dependent upon the design of the valve body, as is the case with member 16.

Although the gate valve structure of this invention has been illustrated as it would be applied in a gasifier apparatus to control the infeed of coal and the discharge of ash, this valve construction has more general application to those instances in which control is desired over the flow of divided solid material from a first volume to a second volume. Further, the gate valve structure of this invention can, of course, be employed in the ash discharge lockhopper in a fixed bed coal gasifier such as is described in U.S. Pat. Application Ser. No. 316,455 — Furman (now abandoned) filed Dec. 19, 1972, and assigned to the assignee of the instant invention wherein the coal is introduced into the gasifier by extrusion.

BEST MODE CONTEMPLATED

The provision of a longitudinally and laterally movable valve body within a housing and the seal/bore/seal arrangement as generally described herein (whereby the seals and the bore are selectively registerable with aligned openings through the housing) is essential. However, it is desirable to employ in combination with the above a) access means for selectively exposing the seals, b) flap valve 53, c) scraping means, d) cleanout holes and/or e) cleaning jets and, as well, to have opening 22 be larger in diameter than bore 34 and have bore 34 be larger in diameter than opening 21.

Although hydraulically actuated means are shown for biasing the valve body and a seal supported thereon into the sealing position, various mechanical biasing means can be devised by the technician skilled in the mechanical arts to accomplish the requisite sealing contact between the seal and the surface around the opening being sealed. Similarly, control means for integrating the movement of flap valve 53 with the linear movement of the valve body can be readily accomplished.

What I claim as new and desire to secure by Letters Patent of the United States is:

1. A gate valve structure comprising:
   an elongate slide member disposed within an elongate housing therefor;

said housing having first and second aligned openings through opposite longitudinally-extending walls of said housing;

means attached to said slide member for moving said slide member longitudinally of said housing and controlling the flow of divided solid material through said housing via said openings;

said slide member comprising a longitudinally-extending valve body having opposed faces, first and second annular seals spaced apart along the length of said valve body and a bore extending through said valve body at a location between said annular seals;

said annular seals and said bore being arranged along said valve body so as to be selectively registerable with said first opening by linear movement of said slide member;

the diameter of each of said annular seals being greater than the diameter of said first opening and said slide member being movable laterally in said housing whereby either of said annular seals may be selectively urged into contact with surface area around said first opening.

2. The gate valve structure of claim 1 wherein the housing has a pair of access holes therethrough, each of said access holes having a removable cover and being disposed where one of the annular seals can be brought into register therewith for access thereto.

3. The gate valve structure of claim 1 wherein a flap valve is disposed adjacent one of the aligned openings for additional control over the flow of divided solid material through the housing and means are provided for selectively positioning said flap valve in a closed position in which it substantially closes off said one opening and in an open position in which said one opening is substantially open and at least a portion of said flap valve projects into the bore.

4. The gate valve structure of claim 1 wherein the annular seals are made of resilient material and are removably accommodated in annular recesses in one face of the valve body.

5. The gate valve structure of claim 1 wherein means are provided to bias the slide member laterally and effectuate contact between an annular seal and surface area around the first opening.

6. The gate valve structure of claim 1 where a cleanout opening is provided through a wall of the housing.

7. The gate valve structure of claim 1 wherein means are provided to direct fluid flow into the housing to remove debris from the slide member.

8. The gate valve structure of claim 1 wherein the valve body is substantially in the shape of an elongate rectangular prism.

9. The gate valve structure of claim 1 wherein the diameter of the bore is greater than the diameter of the first opening and the diameter of the second opening is greater than the diameter of said bore.

10. In an apparatus for generating a gas mixture containing combustible components wherein a sealable solid fuel supply vessel receives divided solid fuel via a first sealable valve by gravity feed, a gasifier vessel receives the solid fuel by gravity feed into the upper region thereof from said supply vessel via a second sealable valve, ash is discharged from the lower region of said gasifier vessel into a second sealable vessel via a third sealable valve and the ash is finally discharged from said second sealable vessel via a fourth sealable valve, the improvement comprising at least one of said first, second, third and fourth sealable valves being a gate valve structure, said gate valve structure comprising:

an elongate slide member disposed with an elongate housing therefor;

said housing having first and second aligned openings through opposite longitudinally-extending walls of said housing;

means attached to said slide member for moving said slide member longitudinally of said housing and controlling flow through said housing via said openings;

said slide member comprising a longitudinally-extending valve body having opposed faces, first and second annular seals spaced apart along the length of said valve body and a bore extending through said valve body at a location between said annular seals;

said annular seals and said bore being arranged along said valve body so as to be selectively registerable with said first opening by linear movement of said slide member;

the diameter of each of said annular seals being greater than the diameter of said first opening and said slide member being movable laterally in said housing whereby either of said annular seals may be selectively urged into contact with surface area around said first opening.

11. The improvement of claim 10 wherein the second sealable valve is the gate valve structure and a flap valve is disposed adjacent one of the aligned openings and means are provided for selectively positioning said flap valve in a closed position in which it substantially closes off said one opening and in an open position in which said one opening is substantially open and at least a portion of said flap valve projects into the bore.

12. The improvement of claim 10 wherein the housing has a pair of access holes therethrough, each of said access holes having a removable cover and being disposed where one of the annular seals can be brought into register therewith for access thereto.

13. The improvement of claim 10 wherein the annular seals are made of resilient material and are removably accommodated in annular recesses in one face of the valve body.

14. The improvement of claim 10 wherein means are provided to bias the slide member laterally and effectuate contact between an annular seal and surface area around the first opening.

15. The improvement of claim 10 where a cleanout opening is provided through a wall of the housing.

16. The improvement of claim 10 wherein means are provided to direct fluid flow into the housing to remove debris from the slide member.

17. The improvement of claim 10 wherein the valve body is substantially in the shape of an elongate rectangular prism.

18. The improvement of claim 10 wherein the diameter of the bore is greater than the diameter of the first opening and the diameter of the second opening is greater than the diameter of said bore.

19. In an apparatus for generating a gas mixture containing combustible components wherein a gasifier vessel receives solid fuel into the upper region thereof via fuel charging means and ash is discharged from the lower region of said gasifier vessel, the discharge of ash being accomplished into a sealable vessel via a first sealable valve after which the ash is discharged from said sealable vessel via a second sealable valve, the improvement comprising having at least one of said first and second sealable valves be a gate valve structure, said gate valve structure comprising:
- an elongate slide member disposed with an elongate housing therefor;
- said housing having first and second aligned openings through opposite longitudinally-extending walls of said housing;
- means attached to said slide member for moving said slide member longitudinally of said housing and controlling flow through said housing via said openings;
- said slide member comprising a longitudinally-extending valve body having opposed faces, first and second annular seals spaced apart along the length of said valve body and a bore extending through said valve body at a location between said annular seals;
- said annular seals and said bore being arranged along said valve body so as to be selectively registerable with said first opening by linear movement of said slide member;
- the diameter of each of said annular seals being greater than the diameter of said first opening and
- said slide member being movable laterally in said housing whereby either of said annular seals may be selectively urged into contact with surface area around said first opening.

20. The improvement of claim 19 wherein the second sealable valve is the gate valve structure and a flap valve is disposed adjacent one of the aligned openings and means are provided for selectively positioning said flap valve in a closed position in which it substantially closes off said one opening and in an open position in which said one opening is substantially open and at least a portion of said flap valve projects into the bore.

21. The improvement of claim 19 wherein the housing has a pair of access holes therethrough, each of said access holes having a removable cover and being disposed where one of the annular seals can be brought into register therewith for access thereto.

22. The improvement of claim 19 wherein the annular seals are made of resilient material and are removably accommodated in annular recesses in one face of the valve body.

23. The improvement of claim 19 wherein means are provided to bias the slide member laterally and effectuate contact between an annular seal and surface area around the first opening.

24. The improvement of claim 19 where a cleanout opening is provided through a wall of the housing.

25. The improvement of claim 19 wherein means are provided to direct fluid flow into the housing to remove debris from the slide member.

26. The improvement of claim 19 wherein the valve body is substantially in the shape of an elongate rectangular prism.

27. The improvement of claim 19 wherein the diameter of the bore is greater than the diameter of the first opening and the diameter of the second opening is greater than the diameter of said bore.

* * * * *